Sept. 2, 1969   W. G. BARB   3,464,876
METHOD OF FORMING A FUSIBLE INTERLINING MATERIAL
Filed Nov. 15, 1965

W. G. BARB
INVENTOR

BY Wendroth,
Lind & Ponack ATTORNEYS

United States Patent Office 3,464,876
Patented Sept. 2, 1969

3,464,876
**METHOD OF FORMING A FUSIBLE
INTERLINING MATERIAL**
Wolfgang Gerson Barb, Gerrards Cross, England, assignor to Staflex International Limited, London, England, a British company
Filed Nov. 15, 1965, Ser. No. 507,846
Claims priority, application Great Britain, Nov. 16, 1964, 46,659/64; Mar. 2, 1965, 8,956/65
Int. Cl. B32b 31/20; C09j 5/00
U.S. Cl. 156—155                                4 Claims

ABSTRACT OF THE DISCLOSURE

A fusible interlining material is produced by adhering to a base fabric a heat softenable thermoplastic net of a type which has localised areas of greater thickness and then breaking the strands connecting such thickened localised areas by the application of heat so that the melted material retracts into the thickened localised areas leaving a pattern of spaced dots of thermoplastic on the surface of the base fabric.

---

Figure 1:
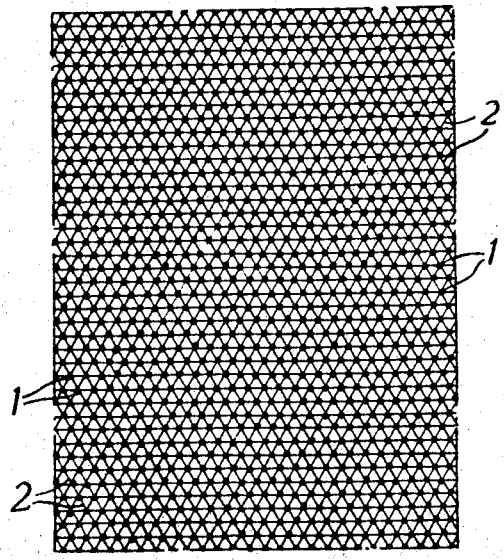

The present invention relates to the production of a fabric, having a thermoplastic material adhered to one or both faces thereof as a pattern of regularly spaced dots to permit the fabric to be bonded to another fabric by the application of heat and pressure.

It is known to apply a thermoplastic material to a base fabric to produce a fusible lining or interlining for use in garment manufacture. It is well recognized that base fabrics for use in the production of fusible linings or interlinings must be porous and it is also recognized that the applied thermoplastic material should be adhered to the base fabric in the form of small non-contiguous dots or globules so as to avoid imparting a paper-like "feel" to the fabric.

It has been the practice heretofore to apply a thermoplastic material, such as polyethylene, to the base fabric by distributing coarsely ground particles of the material onto the fabric so as to form a layer of randomly distributed, non-contiguous particles, which are caused to adhere to the base fabric by heat.

It is also known to apply a thermoplastic material to a fabric by a printing operation so as to provide a pattern of closely adjacent, regularly spaced, small dots, which are effective to bond the base fabric to another layer of fabric under the application of heat and pressure. In practice this printing method requires the application of the resin in the form of a plastisol. That method therefore cannot be employed where the base fabric has an open structure, with large interstices, or where the base fabric is hairy.

In recent years there have become available various forms of non-woven nets, made from polyethylene or other thermoplastic material, which are non-sticky at normal temperatures.

In one example such net is produced by embossing an appropriate pattern in sheet polyethylene and then converting the embossed sheet into a net or mesh by stretching.

It is a characteristic of such nets that they consist of a regular pattern of spaced, small, relatively thick areas of plastic material, joined to each other by strips or strands of plastic material of lesser thickness.

In another example a net may be formed by superimposing a layer of parallel spaced polyethylene threads on a second layer of parallel spaced threads extending in a direction transverse to the first layer and then joining said two layers by the action of heat. Such net is thicker at the cross-over points where the threads cross each other and are fused together.

According to one aspect of the invention a base fabric is brought into contact with a net or mesh made of a thermoplastic substance, which has a melting point within the range of 100–200° C., preferably 100–160° C., the said net or mesh having localised areas, at which the thickness of the plastic material is greater than that of the plastic material joining such localised areas, said net and said fabric being united by the application of heat and, where necessary, light pressure, application of heat being carried out under such conditions that the strands or threads of the net are broken. The plastic material of the net or mesh is softened by heat and there is a tendency for the plastic net or mesh material to form into spherical globules at the thick areas, causing the remainder of the net to become thinner. By the correct application of heat the strips or strands of thermoplastic material joining the thickened areas may be caused to break so that the thermoplastic material is left as a series of regularly spaced separated globules adhered to the surface of the base fabric at a spacing corresponding to that of the thickened areas of the original net or mesh.

The process of the present invention can be utilised to produce a fusible interlining using an open fabric or a hairy fabric base.

The weight of the coating of thermoplastic dots applied to a base fabric by this method preferably lies within the range of 5–50 grams/square metre.

It will readily be understood that for certain end uses, it is desirable to apply a facing of thermoplastic material in the form of regularly spaced dots or globules to both surfaces of the base fabric, although for most purposes, such as use as a fusible interlining, the facing of thermoplastic material is usually applied by uniting a thermoplastic net or mesh to only one face of the fabric.

Where the end use of the fabric may result in it being washed or being subjected to dry-cleaning, then the thermoplastic material must be water-insoluble and resistant to dry-cleaning solvents, at least by the time it has undergone the final fusing to which it is to be subjected.

The base fabric may be a woven, knitted or non-woven fabric, but must necessarily be of a material which is not spoilt by subjection to the heating required to produce surface fusion and adhesion of the thermoplastic net or mesh thereto.

According to the end use of the fusible interlining the thermoplastic applied to the base fabric must be capable of producing a bond with another fabric capable of resisting normal laundering or capable of resisting all normal dry cleaning solvents.

Figure 2:
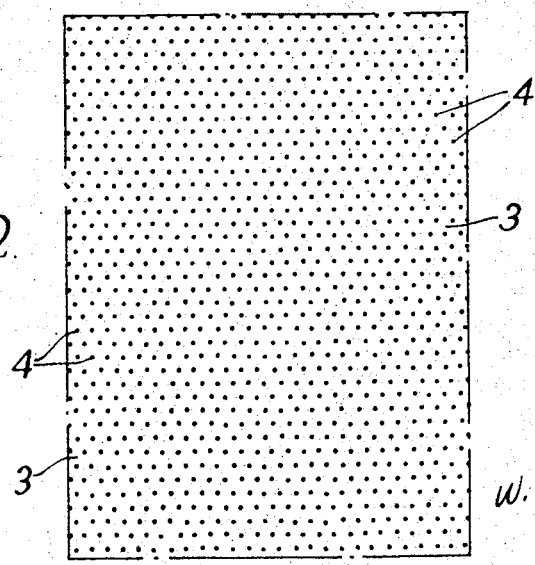

Referring to the accompanying drawings:
FIGURE 1 is a plan view of a polythene net for use in the process of the present invention.
FIGURE 2 is a plan view of an interlining fabric produced by the process of the present invention.

The net shown in FIGURE 1 is a known commercial product having small thick areas 1, joined by relatively thin strands 2. The net is formed by a stretching operation, so that when it is subjected to heat, the thin strands 2 melt and the oriented polythene retracts automatically into the thickened areas 1.

The interlining fabric illustrated in FIGURE 2 is produced by subjecting the net of FIGURE 1 to heating whilst it is in contact with (and preferably pressed against) a base fabric. The base fabric 3 acquires a regular pattern of polythene dots 4, which have the same spacing as the thick areas 1 of the original net.

In one example of the production of a fusible interlining material in accordance with the invention a coating of polythene having a weight of about 20–25 grams/ square metre was applied to a base fabric in the form of regularly-spaced dots or globules spaced 2–3 mms. apart. The spacing of the globules corresponded to the spacing of the locally thickened areas in a non-woven polythene net from which the fusible interlining was produced.

In this instance the net was made from high density polythene film, having an initial thickness of 0.228 mms. which was embossed and stretched to produce a net having thin threads or strands, meeting at thicker intersection points, having the original film thickness, at a spacing of 2–3 mms. These intersection points are about 0.8 mms. in diameter and constitute thickened areas in relation to the remainder of the net. When bonded to the base fabric and after rupture of the connecting threads, the resulting dots or globules of polythene have a diameter of 0.8–1.0 mms. The polythene forming the net had a melt flow index of about 10.

The base fabric may be any one of a large number of fabrics employed as base fabrics for the production of fusible interlinings in garment manufacture.

One example of a suitable fabric is a 76 x 46 38's/42's bleached cotton having a weight of 70 grams/square metre.

The application of the desired pattern of polythene globules on the base fabric may be achieved in several ways. In one method the fabric is passed through a heating device in such a way as to raise the top surface temperature of the fabric to approximately 170° C.

The heated fabric then passes between a pair of nip rolls, the lower one of which is rubber-covered, the upper a copper roll heated to approximately 60° C. The polythene net is fed over the rubber-covered roll into the nip and pressure between the rolls adjusted to give a bond between the relatively thick dots and the fabric with a minimum of flattening of the dots, the heat content of the fabric preferably causing the strands connecting the dots in the net to break at this point.

The fabric with net adhering to it is preferably finally heated by infra-red heaters applied to the top surface to improve the smoothness of the dots by causing them to melt and, if necessary, to complete the breakage and retraction of the strands in the net.

It is always preferable that one of the nip rolls should have a soft surface and the softer the surface covering of this roll, the higher may be the surface temperature of the heated roll without causing undesirable compression of the locally thickened areas at the junction points in the thermoplastic net.

I claim:
1. A process for the production of a fusible interlining fabric having regularly spaced dots or globules of a thermoplastic substance thereon comprising
    (a) bringing a base fabric into contact with a net or mesh made of a thermoplastic substance, which has a melting point in the range of 100–200° C., the said net or mesh having localised areas, at which the thickness of the thermoplastic material is greater than that of the strands or threads of thermoplastic material joining such thick localised areas,
    (b) uniting said net or mesh and said fabric under conditions of heat and pressure and
    (c) then applying further heat to said united net and fabric to cause rupture of the strands or threads of the net or mesh.
2. A process according to claim 1, in which the net is formed of polyethylene.
3. A process according to claim 1 further including the uniting of a relatively hot base fabric and a relatively cool thermoplastic net by the application of pressure.
4. A process according to claim 1, further including using a thermoplastic net or mesh material having a weight within the range of 5–50 grams/square metre to be applied to the base fabric.

References Cited

UNITED STATES PATENTS

| 2,116,289 | 5/1938 | Shepherd. |
| 2,564,689 | 8/1951 | Harwood et al. |
| 2,705,498 | 4/1955 | Johnson _____ 161—148 |
| 3,186,893 | 6/1965 | Mercer. |

MORRIS SUSSMAN, Primary Examiner

U.S. Cl. X.R.

117—65; 156—306, 322; 161—148